US005956346A

United States Patent [19]
Levan

[11] Patent Number: 5,956,346
[45] Date of Patent: Sep. 21, 1999

[54] BROADBAND COMMUNICATION SYSTEM USING TV CHANNEL ROLL-OFF SPECTRUM

[75] Inventor: William Levan, San Jose, Calif.

[73] Assignee: Hybrid Networks, Inc., San Jose, Calif.

[21] Appl. No.: 08/735,110

[22] Filed: Oct. 22, 1996

[51] Int. Cl.⁶ ....................................................... H04J 1/00
[52] U.S. Cl. ........................... 370/480; 370/312; 348/385
[58] Field of Search ..................... 370/480, 477, 370/486, 487, 312, 522, 535, 481, 482, 484, 485, 488; 348/385, 423

[56] References Cited

U.S. PATENT DOCUMENTS

| | | |
|---|---|---|
| 5,530,471 | 6/1996 | Göckler et al. ........................ 370/487 |
| 5,553,064 | 9/1996 | Paff et al. ............................... 370/487 |
| 5,610,916 | 3/1997 | Kostreski et al. ...................... 370/487 |
| 5,646,942 | 7/1997 | Oliver et al. ........................... 370/312 |

*Primary Examiner*—Douglas W. Olms
*Assistant Examiner*—Shick Hom
*Attorney, Agent, or Firm*—Kile McIntyre & Harbin

[57] ABSTRACT

An apparatus and method for channelizing wide band data at radio frequencies (RF) above that of a highest television channel a television headend is equipped to utilize or below 54MHz. In particular, the apparatus and method functioning so as to transmit 2MHz subchannels of data at roll-off band frequencies to at least one client in full-duplex, asymmetric hybrid network communication system.

43 Claims, 9 Drawing Sheets

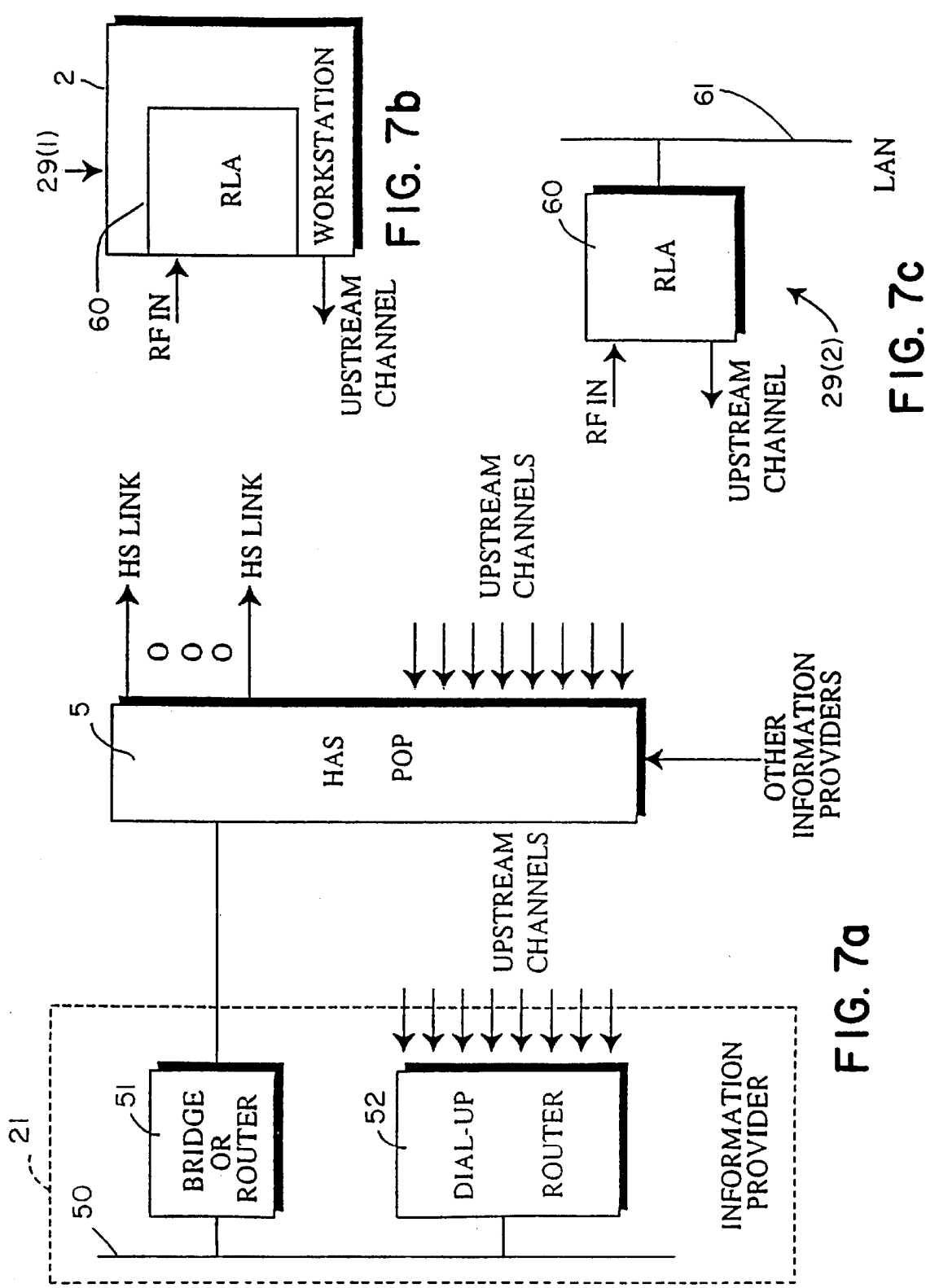

BROADBAND COMMUNICATION SYSTEM USING TV CHANNEL ROLL-OFF SPECTRUM

The present invention relates generally to the use of the channel roll-off band of a television headend facility for data transfer in a network that carries digital data over RF frequency channels, and more particularly to the use of 2 MHz subchannels to transport data in a network, such as a full-duplex, asymmetric, hybrid network where the subchannels reside in the frequency range above and/or below the highest and lowest television channels a television headend facility is equipped to utilize.

BACKGROUND ART

The use of a television channel carrier for the transmission of digital data is known. However, the transmission of high speed digital data over television channels in a television subscriber network requires that a television headend facility dedicate television channels that would otherwise carry television programming for the transmission of digital data. Due to the proliferation of the Internet and intranets and the ever increasing demand for more data throughput by clients of such networks, methods of increasing quality throughput of digital data while not decreasing the number of television channels available to subscriber television clients are desirable.

SUMMARY OF THE INVENTION

The present invention provides an apparatus and method for increasing the quality throughput of data to be transmitted over a television subscriber network without decreasing the channels available for television programming by using the roll-off band of television headend equipment for carrying digital data. By doing so, a television headend facility is able to provide access to the Internet without having to decrease television programming and without having to upgrade its equipment to provide more television channel capacity.

An embodiment of the present invention also provides an efficient scheme for subdividing roll-off band bandwidth from a standard television channel bandwidth (e.g., 6 MHz) into plural subchannels of data rates that match the data rate of the network to which client devices are connected. By subdividing, one can reduce the overall effect of noise ingress, near-end cross talk, intermodulation, and sensitivity to frequency response on the client devices receiving data over the roll-off band channel.

It is thus an object of the present invention to increase the channels provided for digital data transfer on a subscriber television network without decreasing the number of television channels available for television programming or upgrading television headend equipment.

A further object of an embodiment of the present invention is to provide a radio frequency (RF) data channel whose throughput is approximately equal to the Ethernet 10 Mbit/sec standard.

It is a further object of the present invention to reduce the effect of noise ingress on clients receiving data in a network over a channel residing in the roll-off band.

A further object of the present invention is to reduce the effect of near-end cross talk on clients receiving data in a network over a channel residing in the roll-off band.

Another object of the present invention is to reduce the effect of intermodulation on clients receiving data in a network over a channel residing in the roll-off band.

A further object of the present invention is to reduce the effect of sensitivity to frequency response variations on clients receiving data in a network over a channel residing in the roll-off band.

A further object of the present invention is to improve the bit error rate of roll-off band channels used for transmission of digital data.

BRIEF DESCRIPTION OF THE DRAWINGS

These and other objects and advantages of this invention will become more apparent and more readily appreciated by reference to the description of the preferred embodiments, taken in conjunction with the accompanying drawings, of which:

FIGS. 7a, b and c are block diagrams of a hybrid access system depicting upstream channels and high speed downstream links to respective client devices in which an embodiment of the present invention is employed.

DETAILED DESCRIPTION OF PREFERRED EMBODIMENTS

The present invention will be better understood by reference to the accompanying drawings.

Figure 1:
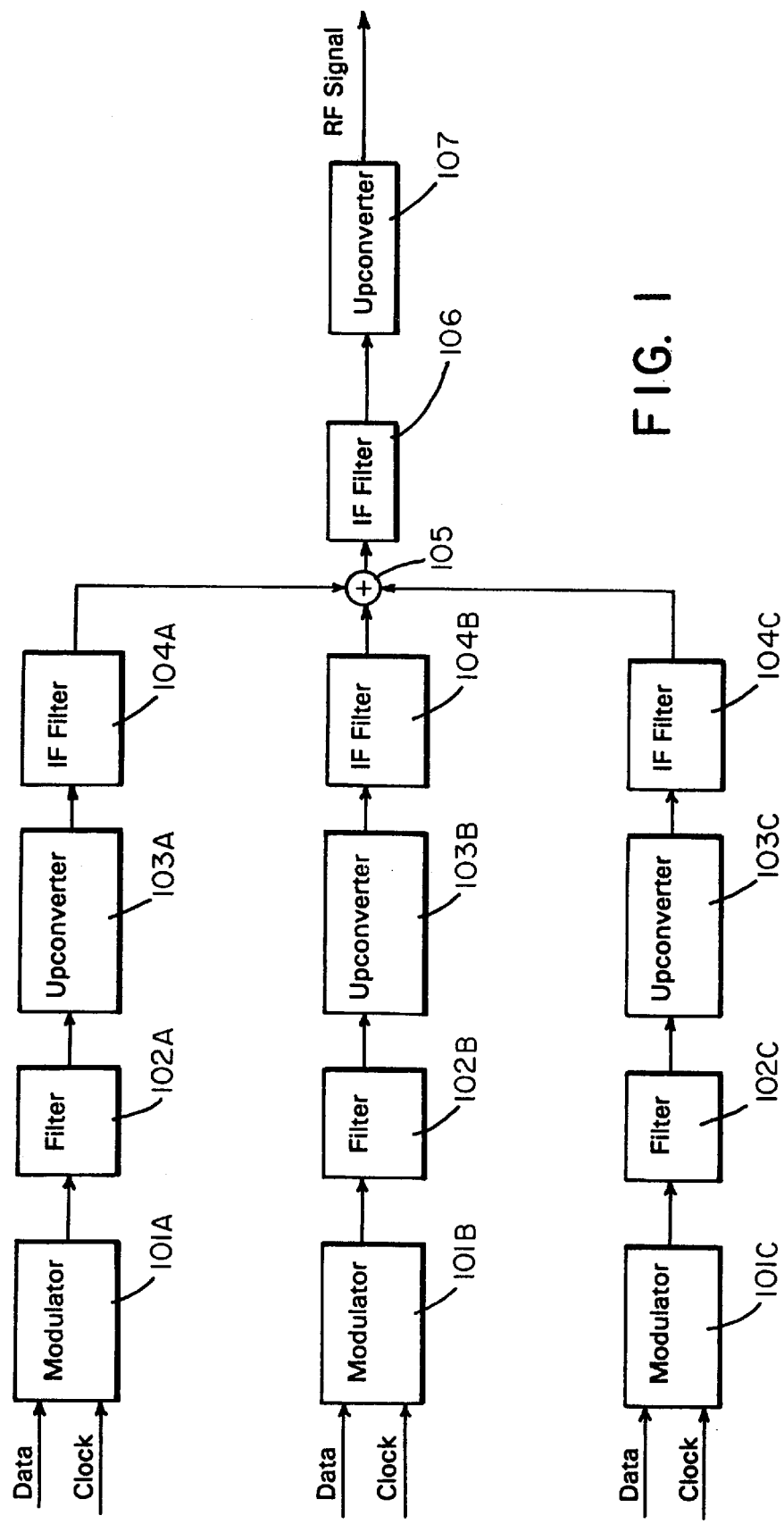
FIG. 1 is a block diagram of a channelizer according to an embodiment of the present invention.

FIG. 1 depicts a three-way channelizer in which three 2 Mhz data channels are combined into one 6 MHz channel and upconverted to an RF frequency in the roll-off band of the television headend equipment. Typically, television headend equipment is capable of utilizing television channels ranging in frequency from 44 MHz to top ends of 440 MHz, 550 MHz, 750 MHz, 803 MHz and 1 GHZ. The roll-off band is made up of bandwidth above and below the television channel range of the headend equipment. The channelization schemes may also be altered to accommodate 8 Mhz channels utilized in Europe and elsewhere. Additionally, other channel widths can be used to accommodate the data, such as a 6 MHz channel carrying one data channel. As shown, three digital data serial streams, each of preferably about 10 Mbits/sec, e.g., a conventional 10BaseT LAN data rate, are input into three modulators 101A–C. Preferably, the modulators use a common clock to modulate three data input streams by quadrature amplitude modulation (QAM). Other forms of modulation, such as vestigial side band (e.g., 4VSB or 8VSB modulation), may be used. 64QAM modulation, however, provides a data throughput of about 1.536 or 1.648 megasymbols per second per subchannel.

After modulation, each of the modulated data streams are low pass filtered by filters 102A–C. Filters 102A–C are preferably elliptically-shaped Butterworth filters having 7 or 9 poles and a cut-off frequency of about 2.5 MHz.

The three filtered signals are then upconverted in upconverters 103A–C using conventional techniques. In the case of 64QAM modulation, the upconverters 103A–C upconvert the signals to intermediate frequency (IF) signals centered about 42 MHz (subchannel A), 44 MHz (subchannel B) and 46 MHz (subchannel C), respectively. The reason that the data streams are modulated and later upconverted is that present circuit limitations prevent direct modulation using 64 QAM. It is to be understood that the scope of the present invention does not exclude direct QAM modulation to intermediate frequencies (IF) for further conditioning and processing by standard television components.

The resulting IF signals are then filtered by IF filters 104A–C. Preferably the IF filters 104A–C are 2 MHz wide surface-acoustic-wave (SAW) filters.

The resulting signals on the respective channels are then combined in adder 105 and again IF filtered by IF filter 106. The output of IF filter 106 is supplied to upconverter 107 where the IF composite signal is upconverted again using techniques common to an RF frequency in the roll-off band of television headend equipment. The frequency can be above the last usable television channel, or below television channel 2. If multiple channelizers are used in accordance with this invention, both the upper and the lower roll-off band may be used. Although it is possible to utilize the roll-off band with a 30 Mbit/sec bit stream being placed into a 6 Mhz channel, it is preferable to place 10 Mbit/sec bit streams into 2 MHz subchannels because the filter needed on a 6 MHz channel would be cost prohibitive.

Figure 2:
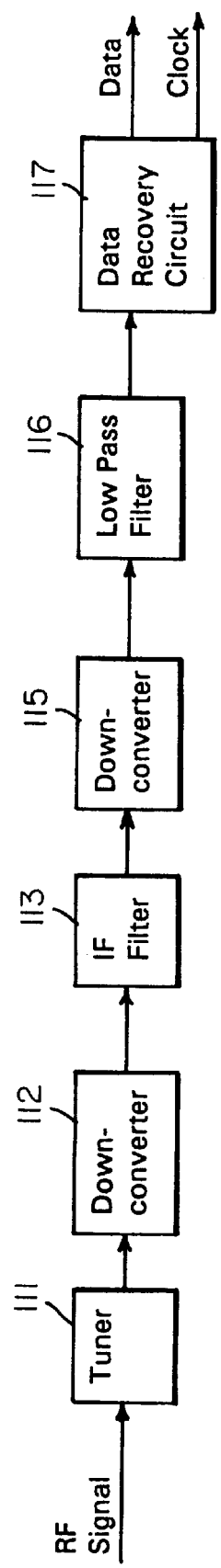
FIG. 2 is a block diagram of a data recovery device according to an embodiment of the present invention.

Referring now to the data recovery circuit of FIG. 2 located at a receiving end of a data transmission, it is seen that data received from the network flows to a client over a specific subchannel. The particular subchannel is defined by the tuned frequency of tuner 111. The incoming RF signals are supplied to the tuner 111 in which a specific 2 Mhz television subchannel frequency is selected (or tuned). For instance, tuner 111 may tune to the RF frequency of 49 MHz, representing subchannel A of the first 6 MHz channel below television channel 2. That signal is then downconverted to an IF frequency centered at 44 MHz in downconverter 112 and run through an IF filter 113, preferably one matching IF filters 104A–C in FIG. 1.

The filtered signal is then downconverted at downconverter 115 to baseband and filtered again at filter 116 preferably using a filter matching filters 102A–C used on the modulating end. The digital data is then recovered from the baseband signal in data recovery circuit 117 using conventional techniques such as baseband sampling at four, eight or sixteen times the symbol rate.

Figure 3:
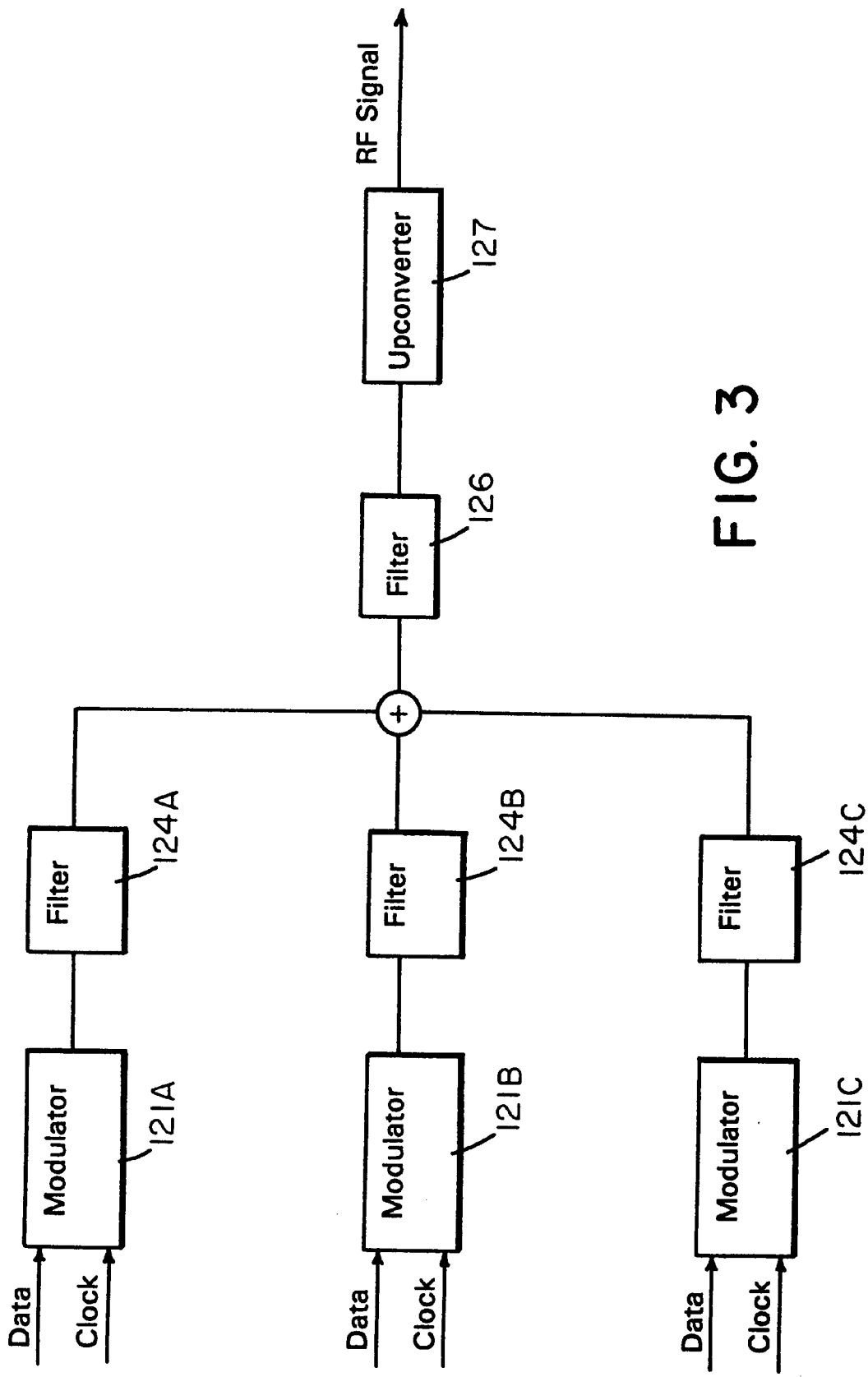
FIG. 3 is a block diagram of a channelizer according to another embodiment of the present invention.

In FIG. 3, under another embodiment of the present invention, three digital data serial streams preferably each utilizing the same clock signal, are input into three modulators 121A–C. These modulators 121A–C vestigial sideband modulate (VSB) the three input data streams by carriers of 42.950 MHz, 44.950 MHz and 46.950 MHz, respectively. Preferably, 4VSB is utilized. However, any other acceptable form of modulation may be used.

The resulting IF signals are then IF filtered in IF filters 124A–C. Preferably the IF filters 124A–C are 2 MHz wide surface-acoustic-wave (SAW) filters.

The resulting signals are then combined in adder 125 and again IF filtered in IF filter 126. The output of IF filter 126 is fed to upconverter 127 where the IF composite signal is upconverted again using conventional techniques to an RF frequency in the roll-off band.

Figure 4:
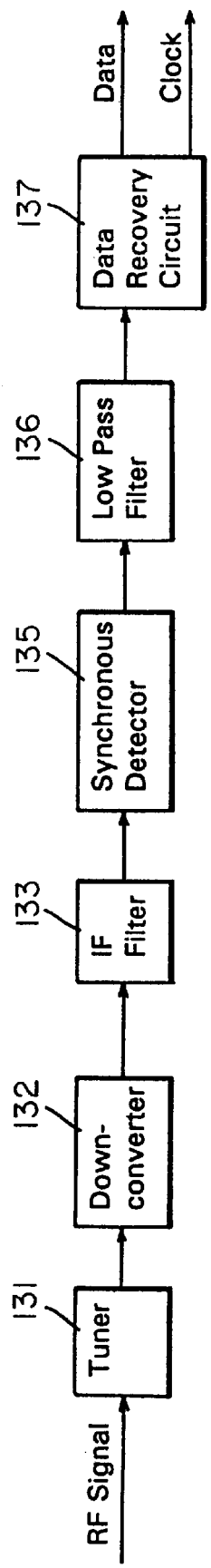
FIG. 4 is a block diagram of a data recovery device according to another embodiment of the present invention.

Referring now to FIG. 4, on the receiving end the data then flows to a client over a specific subchannel. The incoming RF signals are fed into a tuner 131 in which a specific roll-off subchannel frequency is selected. That signal is then downconverted to an IF frequency centered at 44 MHz in downconverter 132 and run through an IF filter 133, preferably one matching IF filters 124A–C in FIG. 3.

The filtered signal is then fed to synchronous detector 135 followed by low pass filter 136. Filter 136 is preferably an elliptically-shaped Butterworth filter with 7 or 9 poles and a cut-off frequency of about 2.5 MHz. The digital data is then recovered from the baseband signal in data recovery circuit 137 using conventional techniques, such as sampling at two times the symbol rate.

It is to be understood that data may be transmitted from a client to a television headend facility utilizing as well by modulating (as described above) a single data bit stream for transmission over the roll-off band.

Figure 5:
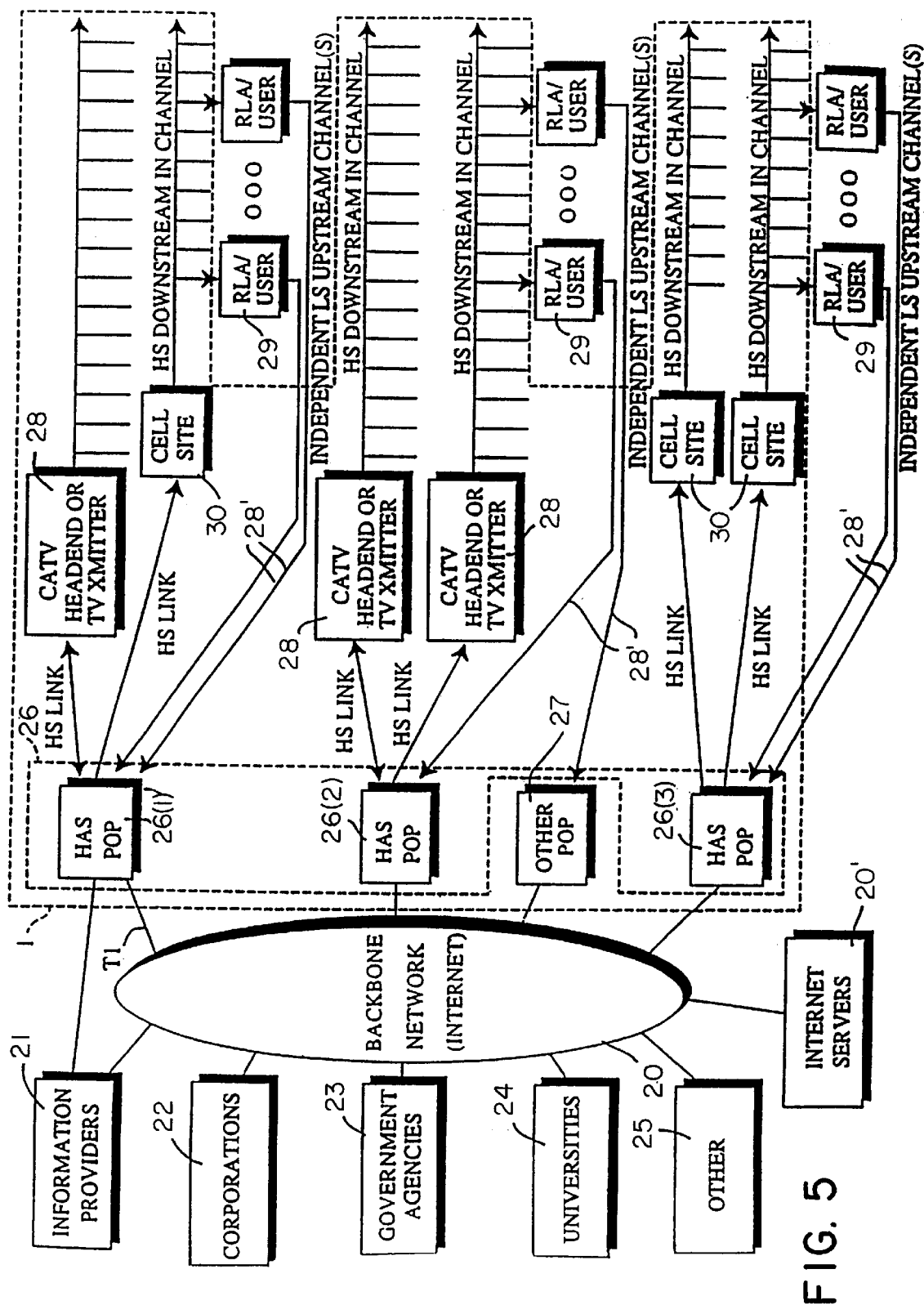
FIG. 5 is a block diagram of a hybrid access system in which the channelizer of the present invention may be employed.

FIG. 5 is a detailed schematic drawing of a hybrid access system 1 in which the channelizer and data recovery device is employed respectively at the cable television headend 28 and a the remote link adapters 29 in order to permit the channelizing of three 2 MHz subchannels into a 6 Mhz channel transmitted from headend 28 via an RF frequency in the roll-off band to plural remote like adapters 29. FIG. 5 shows a remote link adapter (RLA) and client workstation 29 connected through hybrid access system 1 to a variety of entities connected to a backbone network 20 such as Internet, including information providers 21, corporations 22, government agencies 23, universities 24, and others 25. A backbone network is one which is typically not directly connected to a client. Hybrid access system 1 includes hybrid access system (HAS) points of presence (POPs) 26 and other points of presence 27. HAS POPs 26 include individual HAS POPs 26 (1)–26(3) which enable communication over a broadband network, either by upstream and downstream cable communications or by downstream cable and upstream telephone communications or various other hybrid configurations (e.g., wireless or satellite). A hybrid access system utilizing the present invention may include: (1) a hybrid access configuration which uses the downstream cable television roll-off band and upstream public switch telephone network (PSTN), wireless RF communications or integrated services digital network (ISDN) telephone lines; (2) a hybrid access configuration which uses the downstream wireless television roll-off band and upstream public switch telephone network (PSTN), wireless RF communications or integrated services digital network (ISDN) telephone lines; (3) a hybrid access configuration which uses both the downstream and upstream cable television roll-off band; (4) a hybrid access configuration which uses both the downstream and upstream wireless television roll-off band; and (5) a hybrid access configuration with the downstream satellite television roll-off band and upstream PSTN, wireless RF communications or ISDN telephone channels.

Backbone network 20 such as the Internet which includes a plurality of Internet serves 20 connected to HAS POPs 26 each including a plurality of host computers and/or servers, collectively referred to as hybrid servers. Hybrid access system 1 further includes broadcast units such as, a cable television headend 28, independent upstream channels 28, and RLA 29. U.S. Pat. No. 5,347,304 (1994) assigned to Hybrid Networks, Inc., describing an example of an RLA, is hereby expressly referenced and incorporated herein in its entirety. An RLA may receive analog broadcast signals including encoded digital information which the RLA decodes and provides to a data terminal or computer. According to an embodiment of the present invention, the downstream flow of information proceeds from HAS POPs 26(1)–26(3) through cable television headend or television transmitters 28 via the television roll-off band or cell sites 30 and through RLA and client workstation 29. Upstream information flow proceeds in one case from RLA and client workstation 29 through independent upstream channels 28 to HASPOP 26(1) and then to backbone network 20 along T1 or T3 or other digital lines. In another case, upstream information proceeds from client workstation through RLA 29 through the cable television network, and cable television headend 28 to hybrid access system point of presence and then through T1, T3, or other digital lines to backbone network 20. The outputs of the cable television headends or television transmitters 28 include the use of the high speed downstream broadband RF roll-off band connected to respective remote clients 29. Hybrid access system 1 further includes a plurality of cell sites 30 connected through high speed links to a corresponding hybrid access system point of presence 5. The outputs of cell sites 30 include the use of the high speed downstream roll-off band connected to selected remote clients 29. A particular remote client 29 can be connected via an independent lower speed upstream channel to a hybrid access system point of presence 26 as discussed below or via a similar independent lower speed upstream channel to another point of presence system 27. By lower speed it is meant as a speed reduced from the speed of the high speed link used to transmit information downstream. A particular hybrid access system point of presence 5 can be connected via duplex high speed links to a plurality of cable television headends or television transmitters, to a plurality of cell sites 30, or a combination of cable television headends or television transmitters 28 and cell sites 30.

Figure 6A:
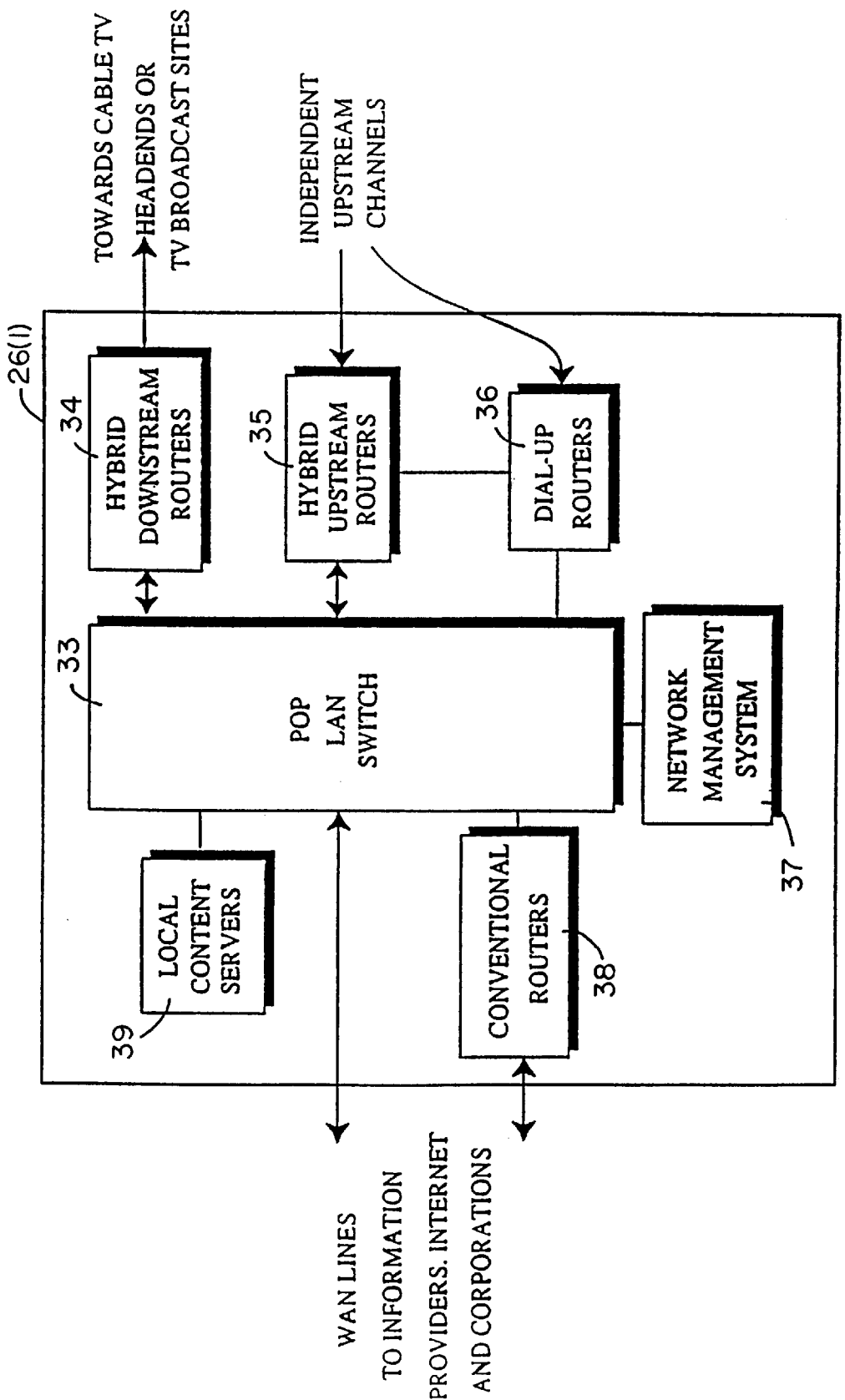
FIG. 6a is a block diagram of a hybrid access system point of presence (POP) in which the channelizer of the present invention may be employed.

FIG. 6a is a schematic drawing of a point of presence (POP) system 26(1) according to the present invention, including-host computers or servers 39 and a POP local area network, i.e., LAN switch 33 to which host computers or servers 39 are connected. Further connected to LAN switch 33 are one or more downstream and one or more upstream hybrid access system point of presence routers, respectively 34 and 35, one or more dial-up routers 36, a network management system 37, and conventional routers 38. Connected to POP LAN switch 33 are one or more data storage elements or systems (not shown). Each downstream hybrid access system point of presence router 34 is connected with a high speed link to a television transmitter or cable television headend for transmission of data via the roll-off band for example. Further, each upstream hybrid access system point of presence router 35 is connected to a plurality of independent upstream channels, which operate at a lower speed than the downstream high speed links to television transmitters or cable television headends. Each dial-up router 36 is connected to a plurality of independent upstream channels operating at a lower speed than the indicated downstream high speed links. Each conventional router 38 is connected along a high speed line to wide area network (WAN) lines to selected information providers, Internet, or other nodes or businesses. POP LAN switch 33 may be connected directly along a high speed line to wide area network (WAN) lines to selected information providers, Internet, or other nodes or businesses.

Figure 6B:
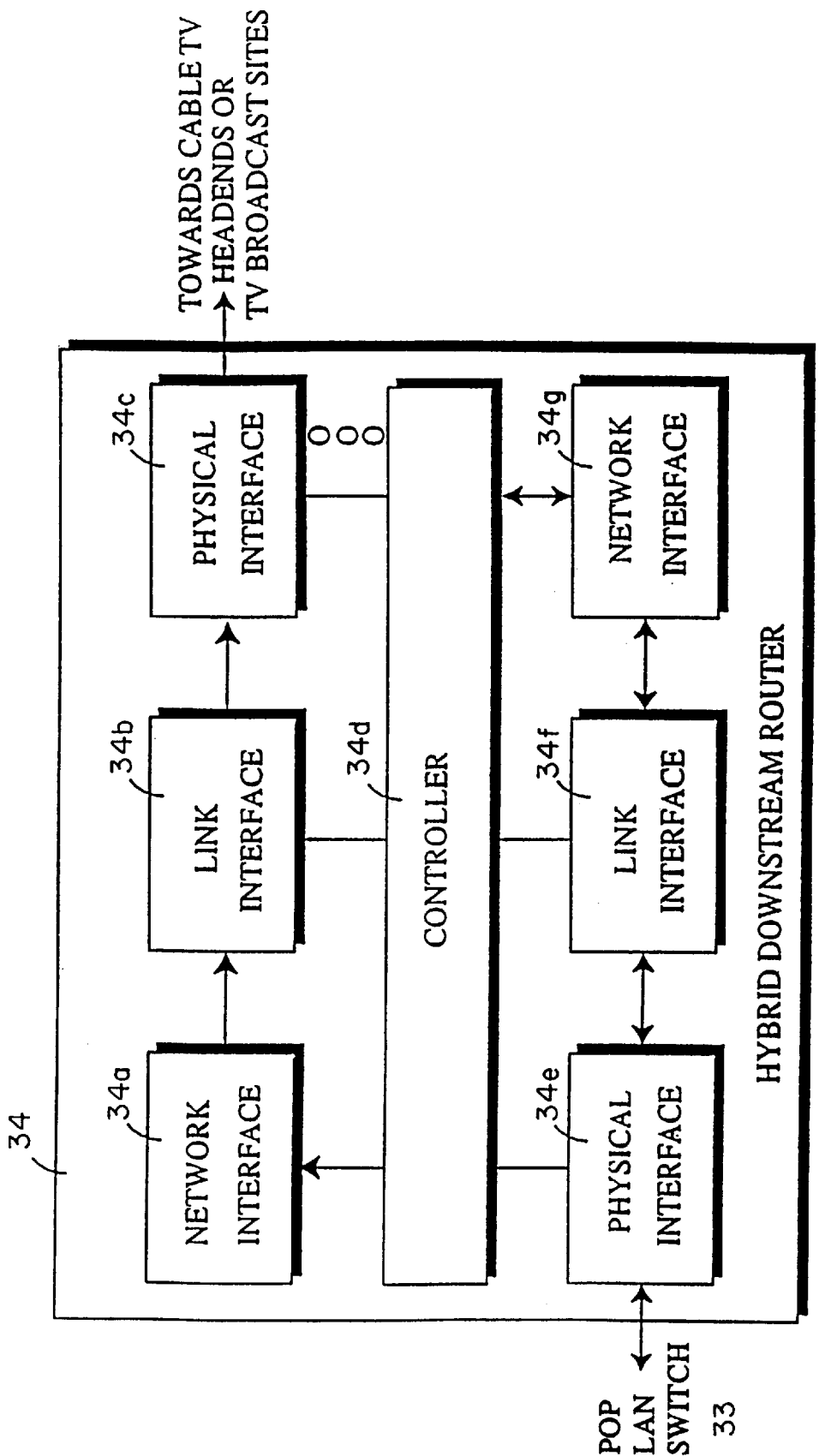
FIG. 6b is a block diagram of a downstream router.

FIG. 6b is a block diagram of hybrid downstream router 34 for use with the present invention. In particular, downstream router 34 includes network interface 34a, link interface 34F, and network interface 34g. Downstream router 34 and physical interface 34e are connected to POP LAN switch 33 for sending and receiving information, and physical interface 34e, link interface 34f, and network interface 34g are serially connected to each other and to controller 34d for bi-directional communication of selected information. Additionally, controller 34d is connected directly to each of physical interface 34e and link interface 34f along indicated lines to accomplish control and messaging functions. Downstream router 34 and physical interface 34c are connected to cable television headends, television broadcast sites, cell cites or the like, to communicate information primarily or exclusively in a unidirectional or downstream direction via the television roll-off band and physical interface 34c, link interface 34b, and network interface 34a are serially connected to each other and to controller 34d for selected communication of selected information. Additionally, controller 34d is connected directly to each of physical interface 34c and link interface 34b along indicated lines to accomplish control and messaging functions. Downstream router 34 may include one or more of physical interfaces 34c. Router 34 may be a bridge without network interfaces 34a and 34g or a connection without network interfaces 34a and 34g and without link interfaces 34b and 34f. Router 34 can also be a gateway.

Figure 6C:
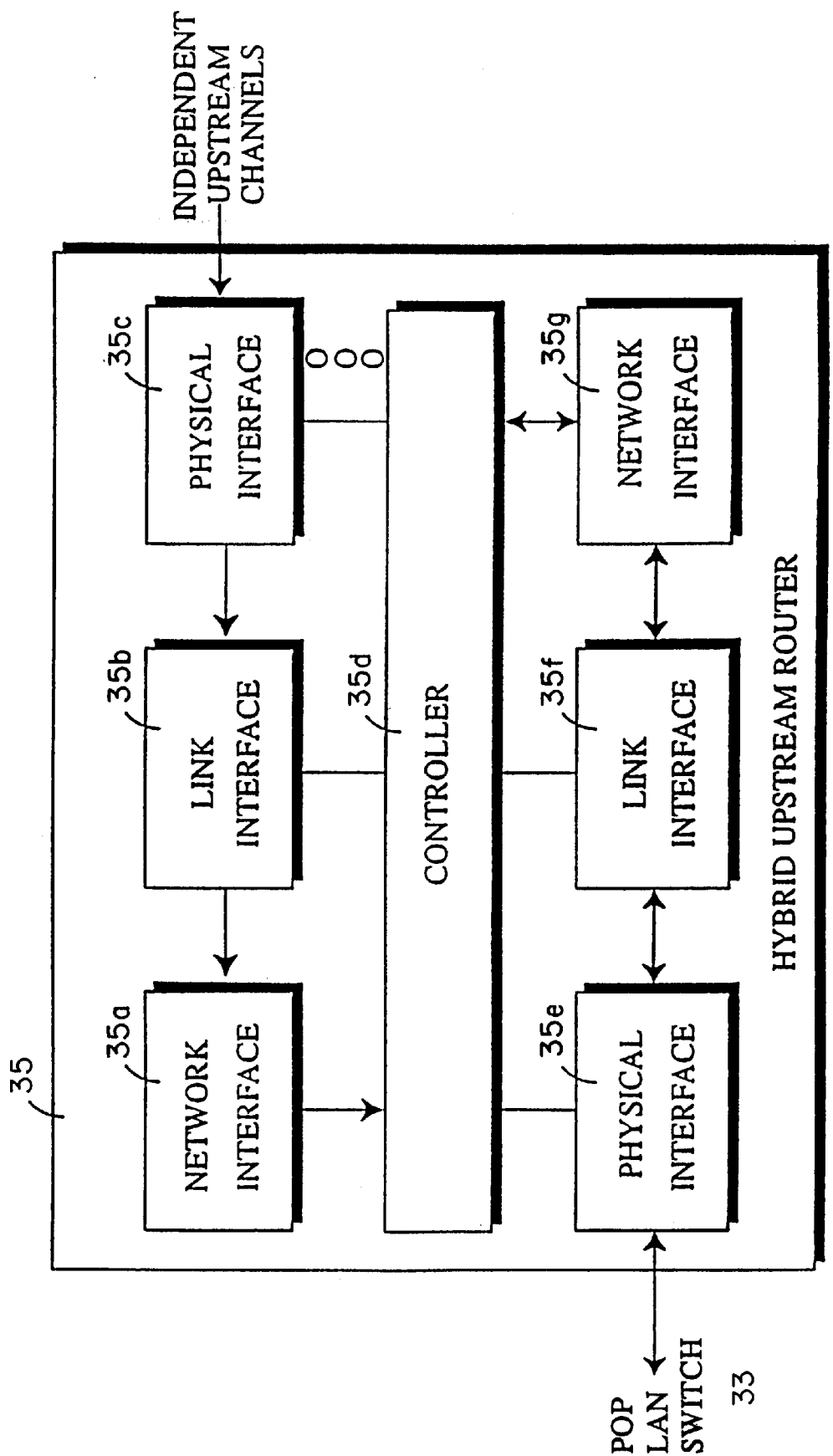
FIG. 6c is a block diagram of an upstream router.

FIG. 6c is a block diagram of upstream router 35 for use with the present invention. In particular, upstream router 35 includes network interface 35a, link interface 35b, physical interface 35c, controller 35d, physical interface 35e, link interface 35f, and network interface 35g. Upstream router 35 and physical interface 35e are connected to POP LAN switch 33 for sending and receiving information, and physical interface 35e, link interface 35f, and network interface 35g are serially connected to each other and to controller 35d for bi-directional communication of selected information. Additionally, controller 35d is connected directly to each other physical interface 35e and link interface 35f along indicated lines to accomplish control and messaging functions. Upstream router 35 and physical interface 35c are connected to upsteam channels, e.g. telephone links for example, to communicate information primarily or exclusively in a unidirectional or upstream direction, and physical interface 35c, link interface 35b, and network interface 35a are serially connected to each other and to controller 35d for selected communication of selected information. Additionally, controller 35d is connected directly to each of physical interfaces 35c and link interface 35b along indicated lines to accomplish control and messaging functions. Upstream router 35 may include one or more of physical interfaces 35c. Router 35 may be a bridge without network interfaces 35a and 35g or a connection without network interfaces 35a and 35g and without link interfaces 35b and 35f. Router 35 can also be a gateway.

FIGS. 7a–c are drawings of a hybrid access system 1 in which a remote client having a workstation 2 is connected to LAN 61, as shown respectively in FIGS. 7b and 7c, can communicate with a selected information provider 21 including LAN 50, bridge or router 51 connected to LAN 50, and dial-up router 52 connected to LAN 50 through a hybrid access system point of presence 5. Further, HAS POP 5 is connected along a high speed link to bridge or router 51. Additionally, HAS POP 5 is linked to other information providers to receive selected information items. Furthermore, dial-up router 52 is connected to a plurality of upstream channels. FIG. 7b and 7c additionally show respective first and second clients, in one case including workstation 2 which includes RLA 60 and in the other instance including RLA 60 and a local area network (LAN) 61 connected to RLA 60. First client 29(1) is connected to an upstream channel from client workstation 2, and second client 29(2) is connected to an upstream channel directly from RLA 60. In the case of each client, RLA 60 receives input information, particularly radio frequency (RF) information along one of respective input subchannels in the roll-off band connected thereto.

Although the examples and embodiments discussed herein utilize three 2 MHz subchannels combined into a 6 MHz channel within the roll-off band, any number subchannels or channels could be used at any reasonable bandwidth. Furthermore, these roll-off subchannels or channels need not be of uniform bandwidth. For example, one subchannel could be a 4 MHz subchannel and another a 2 MHz subchannel.

EXAMPLES

A test was conducted in which a bit error rate tester was connected to a 64QAM modulator. A 30 Mbit/sec digital data stream was then passed through the modulator and upconverted to an RF signal of a standard television channel frequency within the range of television channels a television headend was capable of utilizing. The RF signal was then downconverted and demodulated at a simulated client. Bit errors in the range of $1\times10-5$ were experienced. The test configuration was then altered so that the same data stream was upconverted to an RF frequency centered at 483 MHz through a television headend with a top available television channel frequency of 440 MHz. That data stream was recovered at a simulated client and bit errors in the range of $3.8\times10-5$ were experienced.

The bit error rate tester was then connected to a channel divider utilizing 64QAM according to the present invention. Three data streams of 10 Mbit/sec each were then fed into the respective inputs of the channel divider according to the present invention (as shown in FIG. 1) and one of those bit streams was recovered at a simulated client (as shown in FIG. 2). This test was repeated for each of the three data streams. Under this test of the utilization of subchannels, bit errors in the range of $1\times10-8$ were experienced. The test configuration was then altered so that the same data streams were then upconverted to an RF frequency centered at 483 MHz through a television headend with a top available television channel frequency of 440 MHz. One of the three data streams was recovered at a simulated client. The test was repeated for each of the three data streams under this test and bit errors in the range of $1.7\times10-7$ were experienced.

The same tests were repeated utilizing 4VSB for the modulation scheme (as shown in FIGS. 3 and 4) with similar results.

Although there was a slight drop in quality utilizing channels and subchannels in the roll-off band versus utilizing standard television channels and subchannels thereof, usable data paths were created in the roll-off band as far as 43 MHz higher than the frequency of the highest television channel a television headend was equipped to utilize. Furthermore, there was a dramatic decrease in the bit error rate utilizing 2 MHz subchannels in the roll-off band versus utilizing a 6 MHz channel.

We claim:

1. A roll-off band channelizing apparatus for use with a high speed, digital network including a television headend and utilizing at least a portion of a radio frequency RF spectrum for transmission of data to at least one client, said apparatus comprising:

a modulator, said modulator modulating a digital data stream into a modulated signal;

an RF upconverter, said RF upconverter upconverting said modulated signal to an RF frequency above that of a highest television channel said television headend is equipped to utilize or below 54 MHz, wherein said upconverted modulated signal is approximately 2 MHZ in bandwidth.

2. The apparatus as in claim 1, wherein a bit rate of said digital data stream is approximately 10 Mbits/sec.

3. The apparatus as in claim 1, wherein a modulator quadrature amplitude modulates said digital data stream.

4. The apparatus as in claim 3, wherein said RF upconverter comprises:

a first upconverter, said first upconverter upconverting said modulated signal to an IF signal; and a second upconverter, said second upconverter upconverting said IF signal to said RF frequency.

5. An apparatus as in claim 1, wherein a modulator vestigial sideband modulates said digital data stream.

6. A data recovery apparatus for use with a high speed, digital network including a television headend and utilizing at least a portion of a radio frequency RF spectrum for transmissionof digital data to at least one client, said apparatus comprising:

a tuner, said tuner tuning to a signal residing at an RF frequency above that of a highest television channel said headend is equipped to utilize or below 54 MHz, wherein said RF signal is approximately 2 MHz in bandwidth;

a first downconverter, said first downconverter downconverting said RF signal to an intermediate frequency IF signal;

a demodulator, said demodulator demodulating said IF signal and recovering said digital data.

7. The apparatus as in claim 6, wherein a bit rate of said digital data is approximately 10 Mbits/sec.

8. An apparatus as in claim 6, wherein said demodulator comprises a sync detector.

9. In a network having a television headend and utilizing at least a portion of a radio frequency RF spectrum to communicate high speed digital data to at least one client, the improvement comprising:

a medium, said medium transporting RF signals to said at least one client;

a plurality of modulators, said modulators each modulating a respective portion of said digital data into a plurality of modulated signals;

an RF upconverter, said RF upconverter upconverting said modulated signals to RF signals residing at a frequency above that of a highest television channel and television headend is equipped to utilize or below 54 MHz and placing said RF signals on said medium, wherein each of said RF signals is approximately 2 MHZ in bandwidth;

a tuner, said tuner tuning to one of said RF signals on said medium;

a first down converter, said first downconverter downconverting said one of said RF signals to an IF signal; and a demodulator, said demodulator demodulating said IF signal and approximately recovering a respective portion of said digital data.

10. An improvement as in claim 9, wherein a bit rate of each of said respective portions of said digital data is approximately 10 Mbits/sec.

11. An improvement as in claim 9, wherein said plurality of modulators quadrature amplitude modulate said digital data.

12. An improvement as in claim 1, wherein said RF upconverter comprises:

a first plurality of upconverters for upconverting said modulated signals to IF signals; and a second upconverter for upconverting said IF signals to said RF signals.

13. An improvement as in claim 9, wherein said plurality of modulators vestigial sideband modulate said digital data.

14. An improvement as in claim 9, further comprising:

a client modulator, said client modulator modulating client data, said client data having a lower bit rate than said respective portion of said digital data;

a client RF upconverter, said client RF upconverter upconverting said modulating client data to a client RF signal residing on an RF frequency above that of a highest television channel said television headend is equipped to utilize or below 54 MHz;

an upstream tuner, said upstream tuner tuning to said client RF signal;

an upstream downconverter, said upstream downconverter downconverting said client RF signal to a client IF signal; and an upstream demodulator, said upstream demodulator demodulating said client IF signal and approximately recovering said client data.

15. The improvement as in claim 14, wherein said client RF upconverter places said client RF signal upon said medium and said upstream tuner tunes to said client RF signal upon said medium.

16. In a hybrid access system including a television headend and utilizing at least a portion of a radio frequency RF spectrum to communicate high speed digital data to at least one client, the improvement comprising:

a medium, said medium transporting RF signals to said at least one client;

a plurality of modulators, said modulators each modulating a respective portion of said digital data into a plurality of modulated signals;

a radio frequency RF upconverter, said RF upconverter upconverting said modulated signals to RF signals residing at a frequency above that of a highest television channel said television headend is equipped to utilize or below 54 MHz and placing said RF signals on said medium, wherein each of said RF signals is approximately 2 MHZ in bandwidth;

a tuner, said tuner tuning to one of said RF signals on said medium;

a first downconverter, said first downconverter downconverting said one of said RF signals to an IF signal; and a demodulator, said demodulator demodulating said IF signal and approximately recovering a respective portion of said digital data.

17. An improvement as in claim 16, wherein a bit rate of each of said respective portions of said digital data is approximately 10 Mbits/sec.

18. An improvement as in claim 16, wherein said plurality of modulators each quadrature amplitude modulate said digital data.

19. An improvement as in claim 18, wherein said RF upconverter comprises:

a first plurality of upconverters for upconverting said modulated signals to upconverter IF signals; and a second upconverter for upconverting said IF signals to said RF signals.

20. The improvement as in claim 16, wherein said plurality of modulators each vestigial sideband modulate said digital data.

21. The improvement as in claim 16, further comprising:

a client modulator, said client modulator modulating client data, said client data having a lower bit rate than said respective portion of said digital data;

a client RF upconverter, said client RF upconverter upconverting said modulating client data to a client RF signal residing on an RF frequency above that of a highest television channel said television headend is equipped to utilize or below 54 MHz;

an upstream tuner, said upstream tuner tuning to said client RF signal;

an upstream downconverter, said upstream downconverter downconverting said client RF signal to a client IF signal; and an upstream demodulator, said upstream demodulator demodulating said client IF signal and approximately recovering said client data.

22. The improvement as in claim 21, wherein said client RF upconverter places said client RF signal upon said medium and said upstream tuner tunes to said client RF signal upon said medium.

23. An improvement in a high speed, asymmetric, full-duplex communication system including a television headend and utilizing at least a portion of a radio frequency RF spectrum to communicate high speed digital data in a downstream direction to at least one client, the improvement comprising:

a medium, said medium transporting RF signals to said at least one client;

a plurality of modulators, said modulators each modulating a respective portion of said digital data into a plurality of modulated signals;

an RF upconverter, said RF upconverter upconverting said modulated signals to RF signals residing at a frequency above that of a highest televisiion channel television headend is equipped to utiliize or below 54 MHz and placing said RF signals on said medium, wherein each of said RF signals is approximately 2 MHZ in bandwidth;

a client tuner, said client tuner tuning to one of said RF signals on said medium;

a first client downconverter, said first client downconverter downconverting said one of said RF signals to an IF signal; and a client demodulator, said client demodulator demodulating said IF signal and approximately recovering a respective portion of said digital data.

24. The improvement as in claim 23, wherein a bit rate of each said respective portions of said digital data is approximately 10 Mbits/sec.

25. The improvement as in claim 23, wherein said plurality of modulators quadrature amplitude modulate said digital data.

26. The improvement as in claim 25, wherein said RF upconverter comprises:

a first plurality of upconverters for upconverting said modulated signals to IF signals; and a second upconverter for upconverting said IF signals to said RF signals.

27. The improvement as in claim 23, wherein said plurality of modulators each vestigial sideband modulate said digital data.

28. The improvement as in claim 23, further comprising:

a client modulator, said client modulator modulating client data for transmission in an upstream direction, said client data having a lower bit rate than said respective portion of said digital data;

a client RF upconverter, said client RF upconverter upconverting said modulated client data to a client RF signal residing on said RF frequency above that of said highest television channel said television headend is equipped to utilize or below 54 MHz;

an upstream tuner, said upstream tuner tuning to said client RF signal;

an upstream downconverter, said upstream downconverter downconverting said client RF signal to a client IF signal; and an upstream demodulator, said upstream demodulator demodulating said client IF signal and approximately recovering said client data.

29. The improvement as in claim 28, wherein said client RF upconverter places said client RF signal upon said medium and said upstream tuner tunes to said client RF signal upon said medium.

30. A method for providing transmission of highspeed digital informatiion by a television headend in a high speed, asymmetric, digital information transmission system utilizing at least a portion of a radio frequency RF spectrum without said television headend utilizing an existing television channel for the transmission of high speed digital information comprising:

modulating digital information;

transmitting said modulated information at an RF frequency above that of highest television channel said television headend is equipped to utilize or below 54 MHz, wherein said modulated information is in a range of 2 MHZ in bandwidth.

31. A data recovery apparatus for use with a high speed, digital network including a television headend and utilizing at least a portion of a radio frequency RF spectrum for transmission of digital data to at least one client, said apparatus comprising:

a tuner, said tuner tuning to a signal residing at an RF frequency above that of a highest television channel said headend is equipped to utilize or below 54 MHz;

a first downconverter, said first downconverter downconverting said RF signal to an intermediate frequency IF signal;

a demodulator, said demodulator demodulating said IF signal and recovering said digital data;

said demodulator comprises:

a second downconverter, said second downconverter downconverting said IF signal to a baseband signal, and a baseband sampler, said baseband sampler recovering said digital data from said baseband signal.

32. An improvement in a network having a television headend and utilizing at least a portion of a radio frequency RF spectrum to communicate high speed digital data to at least one client, the improvement comprising:

a medium, said medium transporting RF signals to said at least one client;

a plurality of modulators, said modulators each vestigial sideband modulate a respective portion of said digital data into a plurality of modulated signals;

an RF upconverter, said RF upconverter upconverting said modulated signals to RF signals residing at a frequency above that of a highest television channel said television headend is equipped to utilize or below 54 MHz and placing said Rf signals on said medium;

a tuner, said tuner tuning to one of said RF signals on said medium;

a first downconverter, said downconverter downconverting said one of said RF signals to an IF signal; and a demodulator, said demodulator demodulating said IF signal and approximately recovering a respective portion of said digital data; and wherein said demodulator comprises a sunc detector.

33. An improvement in a network having a television headend and utilizing at least a portion of a radio frequency RF spectrum to communicate high speed digital data to at least one client, the improvement comprising:

a medium, said medium transporting RF signals to said at least one client;

a plurality of modulators, said modulators each quadrature amplitude modulate a respective portion of said digital data into a plurality of modulated signals;

an RF upconverter, said RF upconverter, said RF upconverter upconverting said modulated signals to RF signals residing at a frequency above that of a highest television channel said television headend is equipped to utilize or below 54 MHz and placing said RF signals on said medium;

a tuner, said tuner tuning to one of said RF signals on said medium;

a first downconverter, said first downconverter downconverting said one of said RF signals to an IF signal; and a demodulator, said demodulator demodulating said IF signal and approximately recovering a respective portion of said digital data;

wherein said RF upconverter comprises:

a first plurality of upconverters for upconverting said modulated signals to IF signals, and a second upconverter for upconverting said IF signals to said RF signals;

wherein said demodulator comprises:

a second downconverter, said second downconverter downconverting said IF signal to a baseband signal, and a baseband sampler, said baseband sampler recovering said digital data from said baseband signal.

34. An improvement in a hybrid access system including a television headend and utilizing at least a portion of a radio frequency RF spectrum to communicate high speed digital data to at least one client, the improvement comprising:

a medium, said medium transporting Rf signals to said at least one client;

a plurality of modulators, said modulators each vestigial sideband modulate a respective portion of said digital data into a plurality of modulated signals;

a radio frequency Rf converter, said RF upconverter upconverting said modulated signals to RF signals residing at a frequency above that of a highest television channel said television headend is equipped to utilize or below 54 MHz and placing said RF signals on said medium;

a tuner, said tuner tuning to one of said Rf signals on said medium;

a first downconverter, said first downconverter downconverting said one of said RF signals to an IF signal; and a demodulator, said demodulator demodulating said IF signal and approximately recovering a respective portion of said digital data, said demodulator comprises a sync detector.

35. An improvement in a hybrid access system including a television headend and utilizing at least a portion of a radio frequency RF spectrum to communicate high speed data to at least one client, the improvement comprising:

a medium, said medium transporting RF signals to said at least one client;

a plurality of modulators, said modulators each quadrature amplitude modulate a respective portion of said digital data into a plurality of modulated signals;

a radio frequency RF upconverter, said RF upconverter upconverting said modulated signals to RF signals residing at a frequency above that of a highest television channel said television headend is equipped to utilize or below 54 MHz and placing said RF signals on said medium;

a tuner, said tuner tuning to one of said RF signals on said medium;

a first downconverter, said first downconverter downconverting said one of said RF signals to an IF signal; and a demodulator, said demodulator demodulating said IF signal and approximately recovering a respective portion of said digital data;

wherein said RF upconverter comprises:

a first plurality of upconverters for upconverting said modulated signals to upconverter IF signals; and a second upconverter for upconverting said upconverter IF signals to said RF signals;

wherein said demodulator comprises:

a second downconverter, said second downconverter downconverting said IF signal of the first downconverter to a baseband signal; and a baseband sampler, said baseband sampler recovering said digital data from said baseband signal.

36. An improvement in a high speed, asymmetric, full-duplex communication system including a television headend and utilizing at least a portion of a radio frequency RF spectrum to communicate high speed digital data in a downstream direction to at least one client, the improvement comprising:

a medium, said medium transporting RF signals to said at least one client;

a plurality of modulators, said modulators each vestigial sideband modulate a respective portion of said digital data into a plurality of modulated signals;

an RF upconverter, said RF upconverter upconverting said modulated signals to RF signals residing at a frequency above that of a highest television channel said television headend is equipped to utilize or below 54 MHz and placing said RF signals on said medium;

a client tuner, said client tuner tuning to one of said RF signals on said medium;

a first client downconverter, said first client downconverter downconverting said one of said RF signals to an IF signal; and a client demodulator, said client demodulator demodulating said IF signal and approximately recovering a respective portion of said digital data, said client demodulator comprises a sync detector.

37. In a high speed, asymmetric, full-duplex communication system including a television headend and utilizing at least a portion of a radio frequency RF spectrum to communicate high speed digital data in a downstream direction to at least one client, the improvement comprising:

a medium, said medium transporting RF signals to said at least one client;

a plurality of modulators, said modulators each quadrature amplitude modulate a respective portion of said digital data into a plurality of modulated signals;

an RF upconverter, said RF upconverter upconverting said modulated signals to RF signals residing at a frequency above that of a highest television channel said television headend is equipped to utilize or below 54 MHz and placing said RF signals on said medium;

a client tuner, said client tuner tuning to one of said RF signals on said medium;

a first client downconverter, said first client downconverter downconverting said one of said RF signals to an IF signal; and a client demodulator, said client demodulator demodulating said IF signal and approximately recovering a respective portion of said digital data;

wherein said RF upconverter comprises:

a first plurality of upconverters for upconverting said modulated signals to IF signals, and a second upconverter for upconverting said IF signals to said RF signals;

wherein said client demodulator comprises:

a second downconverter, said second downconverter downconverting said IF signal to a baseband signal; and a baseband sampler, said baseband sampler recovering said digital data from said baseband signal.

38. A roll-off band channelizing apparatus for use with a high speed, digital network including a television headend that operates within an allocated television spectrum and utilizing at least a portion of a radio frequency RF spectrum for transmission of data to at least one client, said apparatus comprising:

a modulator, said modulator modulating a digital data stream into a modulated signal;

an RF upconverter, said RF upconverter upconverting said modulated signal to a RF frequency either above, below or above and below that of said television spectrum said headend is equipped to utilize, wherein said upconverted modulated signal has a bandwidth that carries data closely approximating the data receiving capacity of said client.

39. In a network having a television headend that operates within an allocated television spectrum and utilizing at least a portion of a radio frequency RF spectrum to communicate high speed digital data to at least one client, the improvement comprising:

a medium, said medium transporting RF signals to said at least one client;

a plurality of modulators, said modulators each modulating a respective portion of said digital data into a plurality of modulated signals;

an RF upconverter, said RF upconverter upconverting said modulated signals to RF signals residing at a frequency either above, below or above and below that of said television spectrum said headend is equipped to utilize and placing said RF signals on said medium, wherein said upconverted modulated signals have a bandwidth that carries data closely approximating the data receiving capacity of said client;

a tuner, said tuner tuning to one of said RF signals on said medium;

a first downconverter, said first downconverter downconverting said one of said RF signals to an IF signal; and a demodulator, said demodulator demodulating said IF signal and approximately recovering a respective portion of said digital data.

40. In a hybrid access system including a television headend that operates within an allocated television spectrum and utilizing at least a portion of a radio frequency RF spectrum to communicate high speed digital data to at least one client, the improvement comprising:

a medium, said medium transporting RF signals to said at least one client;

a plurality of modulators, said modulators each modulating a respective portion of said digital data into a plurality of modulated signals;

a radio frequency RF upconverter, said RF upconverter upconverting said modulated signals to RF signals residing at a frequency either above, below or above and below that of said television spectrum said headend is equipped to utilize and placing said RF signals on said medium, wherein said upconverted modulated signals have a bandwidth that caries data closely approximating the data receiving capacity of said client;

a tuner, said tuner tuning to one of said RF signals on said medium;

a first downconverter, said first downconverter downconverting said one of said RF signals to an IF signal; and a demodulator, said demodulator demodulating said IF signal and approximately recovering a respective portion of said digital data.

41. In a high speed, asymmetric, full-duplex communication system including a television headend that operates within an allocated television spectrum and utilizing at least a portion of a radio frequency RF spectrum to communicate high speed digital data in a downstream direction to at least one client, the improvement comprising:

a medium, said medium transporting RF signals to said at least one client;

a plurality of modulators, said modulators each modulating a respective portion of said digital data into a plurality of modulated signals;

an RF upconverter, said RF upconverter upconverting said modulated signals to RF signals residing at a frequency either above, below or above and below that of said television spectrum said headend is equipped to utilize and placing said RF signals on said medium, wherein said upconverted modulated signals have a bandwidth that carries data closely approximating the data receiving capacity of said client;

a client tuner, said client tuner tuning to one of said RF signals on said medium;

a first client downconverter, said first client downconverter downconverting said one of said RF signals to an IF signal; and a client demodulator, said client demodulator demodulating said IF signal and approximately recovering a respective portion of said digital data.

42. A method for providing for transmission of highspeed digital information by a television headend in a high speed, asymmetric, digital information transmission system that operates within an allocated television spectrum and utilizing at least a portion of a radio frequency RF spectrum without said television headend utilizing an existing television channel for the transmission of high speed digital information comprising:

modulating digital information;

transmitting said modulated information at a RF frequency either above, below or above and below that of said television spectrum said headend is equipped to utilize, wherein said modulated information has a bandwidth that carries data closely approximating the data receiving capacity of a client.

43. A data recovery apparatus for use with a high speed, digital network including a television headend that operates within an allocated television spectrum and utilizing at least a portion of a radio frequency RF spectrum for transmission of digital data to at least one client, said apparatus comprising:

a tuner, said tuner tuning to a signal residing at a RF frequency either above, below or above and below that of said television spectrum said headend is equipped to utilize, wherein said signal has a bandwidth that carries data closely approximating the data receiving capacity of said client;

a first downconverter, said first downconverter downconverting said RF signal to an intermediate frequency IF signal; a demodulator, said demodulator demodulating said IF signal and recovering said digital data.

* * * * *